UNITED STATES PATENT OFFICE.

FREDERICK M. BECKET, OF NIAGARA FALLS, NEW YORK, ASSIGNOR TO ELECTRO METALLURGICAL COMPANY, OF CHICAGO, ILLINOIS, A CORPORATION OF WEST VIRGINIA.

PROCESS OF PRODUCING FERRO-ALLOYS.

No. 898,173.      Specification of Letters Patent.      Patented Sept. 8, 1908.

Application filed May 25, 1908. Serial No. 434,852.

*To all whom it may concern:*

Be it known that I, FREDERICK M. BECKET, a subject of the King of England, residing at Niagara Falls, in the county of Niagara and State of New York, have invented certain new and useful Improvements in Processes of Producing Ferro-Alloys, of which the following is a specification.

The object of this invention is to provide a process of producing low-carbon ferroalloys of refractory metals as chromium, tungsten, vanadium and the like by the use of carbids of the alkali earth metals, as calcium carbid or barium carbid, as reducing agents.

It is well known that calcium carbid possesses strong reducing properties, and that metallic compounds, and more particularly such as contain sulfur, may be reduced by its use. In such case the calcium carbid is usually employed in such proportion that the calcium suffices for the reduction, and a part or all of the carbon of the carbid unites with the reduced metal, yielding therewith either a definite carbid or a metallic product high in carbon. I have discovered that by utilizing the reducing action of calcium carbid or carbids of other alkali earth metals in an electric furnace and under proper conditions as hereinafter set forth, both the alkali earth metal and carbon constituents of the carbid may be oxidized with such degree of completeness that the metallic product obtained contains less carbon than would be the case if carbon alone were used as a reducing agent, the proportion of carbon so used being sufficient to secure a commercial efficiency of operation.

The process has been found to be particularly applicable to the treatment of the oxid ores or oxidized compounds of the refractory metals chromium, tungsten, and vanadium, which metals as is well known exhibit a strong tendency to combine with free carbon employed as a reducing agent and to form therewith high carbon products of comparatively low commercial value. As examples of ores which may be advantageously treated I will specify chromite, chrome iron ore, wolframite, and oxid ores of vanadium or oxid compounds of vanadium produced from its sulfid or other ores. It will be understood that the term ores is employed to include concentrates.

In case silicious ores, or ores yielding an acid slag, are treated with calcium carbid, the calcium oxid resulting from the oxidation of the calcium may be in sufficient proportion to yield with the silica a suitable slag, and in such case no additional flux need be employed; however in case the ores are highly silicious, as for example certain vanadium ores, it will generally be necessary to add additional lime or other basic flux. When on the contrary the process is applied to ores yielding a basic slag, silica or other acid flux may be added to the charge. In general the charge will be composed to yield a slag having the proper composition to provide when molten a path for the current, and to impart the heat necessary for the reduction and for the preparation of a product of low carbon content.

In practicing the invention the ore, previously crushed or granulated, may be mixed with calcium carbid and with such proportions of lime or silica as may be required for the production of a suitable slag. The charge so prepared is fed between electrodes, usually of carbon or graphite, and is subjected to a temperature sufficient to produce a molten bath. Inasmuch as reduction may occur at temperatures less than are required for the substantially complete oxidation of the carbon, such temperatures are provided that the reducing effect of the carbon will be substantially fully utilized, under which conditions a product low in carbon is obtained. The proportions of the components of the charge will preferably be such that the oxygen of the ore will substantially suffice for the oxidation both of the calcium and the carbon of the carbid.

The particular advantages of the process as applied to the refractory metals mentioned are as follows:— (1) The metals mentioned possess a high affinity for free carbon and combine with or absorb the same when carbon is used as a reducing agent; whereas in the use of carbids of alkali earth metals as reducing agents the proportion of carbon in the charge is greatly reduced, and such carbon as is present exists in the combined state, these conditions rendering it far less liable to combine with the metal during the period which must necessarily elapse before all portions of the carbon can exert their reducing effect upon the ore; (2) the electric furnace operation requires for its efficient practice a comparatively large proportion of slag-forming ingredients, which it has been customary to add in the form of lime, silica, etc., proportioned to the requirements of the ore, these materials increasing the weight of the charge for a given output of metal and requiring the expenditure of a large quantity of energy to bring them to a reacting temperature. With oxid ores however calcium carbid, for example, as a reducing agent yields calcium oxid, supplying at the same time by the oxidation of calcium a large amount of heat, and to this extent economizing the current in the operation of producing metals and alloys. While electrical energy has been absorbed in the production of calcium carbid to be utilized in this manner, it is found in practice that advantages are secured in the production of refractory metals, by first producing calcium carbid in a furnace particularly adapted to this operation, and later utilizing its reducing effect in an electric furnace particularly adapted to the production of metals or alloys of low-carbon content.

For the production of ferroalloys of the refractory metals, any desired proportion of iron may be added to the charge, in case it does not occur in sufficient proportion as a constituent of the ore: Ores, as chrome iron ores, containing a considerable proportion of iron do not ordinarily require such addition. Obviously the oxid ores of iron may be added, but in this case an additional proportion of carbid is required for their reduction. In all cases the process is preferably rendered continuous by adding fresh portions of the charge as required and withdrawing the molten product from time to time, thereby conserving to the greatest possible degree the heat of the furnace.

I claim:

1. The process of producing low-carbon ferroalloys which consists in electrically smelting a charge containing a refractory oxid ore, a source of iron and a carbid of an alkali-earth metal, the carbid being present in proportion to yield a metallic product low in carbon.

2. The process of producing low-carbon ferroalloys which consists in electrically smelting a charge containing a refractory oxid ore, a source of iron, a carbid of an alkali-earth metal, and a suitable flux, the carbid being present in proportion to yield a metallic product low in carbon.

3. The continuous process of producing low-carbon ferroalloys which consists in electrically smelting a charge containing a refractory oxid ore, a source of iron and a carbid of an alkali-earth metal, the carbid being present in proportion to yield a metallic product low in carbon, supplying fresh portions of the charge as required and withdrawing the product from time to time.

4. The process of producing low-carbon ferroalloys which consists in electrically smelting a charge containing a refractory oxid ore, a source of iron and calcium carbid, the calcium carbid being present in proportion to yield a metallic product low in carbon.

5. The process of producing low-carbon ferroalloys which consists in electrically smelting a charge containing a refractory oxid ore, a source of iron, calcium carbid, and a suitable flux, the calcium carbid being present in proportion to yield a metallic product low in carbon.

6. The continuous process of producing low-carbon ferroalloys which consists in electrically smelting a charge containing a refractory oxid ore, a source of iron and calcium carbid, the calcium carbid being present in proportion to yield a metallic product low in carbon, supplying fresh portions of the charge as required and withdrawing the product from time to time.

7. The process of producing low-carbon ferrochrome which consists in electrically smelting a charge containing chrome iron ore and calcium carbid, the calcium carbid being present in proportion to yield a metallic product low in carbon.

8. The process of producing low carbon ferrochrome which consists in electrically smelting a charge containing chrome iron ore, calcium carbid, and a suitable flux, the calcium carbid being present in proportion to yield a metallic product low in carbon.

9. The continuous process of producing low-carbon ferrochrome which consists in electrically smelting a charge containing chrome iron ore and calcium carbid, the calcium carbid being present in proportion to yield a metallic product low in carbon, supplying fresh portions of the charge as required and withdrawing the product from time to time.

In testimony whereof, I affix my signature in presence of two witnesses.

FREDERICK M. BECKET.

Witnesses:
J. N. DEINHARDT,
DEAN BURGESS.